United States Patent

[11] 3,615,352

[72] Inventor Francis X. Mayer
 Baton Rouge, La.
[21] Appl. No. 723,874
[22] Filed Apr. 24, 1968
[45] Patented Oct. 26, 1971
[73] Assignee Esso Research and Engineering Company
 Continuation-in-part of application Ser. No. 398,073, Sept. 21, 1964, now abandoned, Continuation-in-part of application Ser. No. 422,559, Dec. 31, 1964, now Patent No. 3,393,066.

[54] PROCESS FOR REDUCTION OF IRON ORE IN STAGED BEDS WITHOUT BOGGING
 11 Claims, No Drawings
[52] U.S. Cl....................................................... 75/26, 75/34
[51] Int. Cl.................................................. C21b 1/02, C21b 15/00
[50] Field of Search.................................... 75/26, 34

[56] References Cited
UNITED STATES PATENTS

| | | | |
|---|---|---|---|
| 2,758,021 | 8/1956 | Drapeau...................... | 75/26 |
| 2,953,450 | 9/1960 | Viles........................... | 75/26 |
| 3,020,149 | 2/1962 | Old.............................. | 75/26 |
| 3,341,322 | 9/1967 | Bailey.......................... | 75/26 |
| 3,393,066 | 7/1968 | Mayer.......................... | 75/34 |

Primary Examiner—Winston A. Douglas
Assistant Examiner—Peter D. Rosenberg
Attorneys—Manahan and Wohlers and Joseph J. Dvorak ABSTRACT: A multistage, high temperature fluidized iron ore reduction process is described wherein bogging or defluidization is prevented by adding specified particulate agents to ferrous reduction zones.

PROCESS FOR REDUCTION OF IRON ORE IN STAGED BEDS WITHOUT BOGGING

BACKGROUND OF THE INVENTION

This application is a continuation-in-part of U.S. application Ser. No. 398,073, filed Sept. 21, 1964, now abandoned, and U.S. application Ser. No. 422,559, filed Dec. 31, 1964, by F. X. Mayer, now U.S. Pat. No. 3,393,066.

This invention relates to the production of particulate iron or reduced iron ore by reduction of particulate oxidic iron ores with reducing gases at high temperatures. In particular, it relates to an improved iron ore reduction process wherein fluidized iron ores are metallized by direct contact with reducing gases such as hydrogen, carbon monoxide, or mixtures of these and other gases.

The production of particulate iron or reduced iron ore by the reduction of oxidic iron ores, i.e., ores containing, or consisting essentially of, oxides of iron, in beds which are fluidized by upwardly flowing gases, at temperatures ranging generally from about 1,000° F. to about 1,800° F., is well known in the art. Moreover, processes are also known wherein the fluidized beds are staged as separate reduction zones, which zones are operated at the same or different elevated temperatures.

In a typical staged fluidized iron ore reduction process, iron oxides are provided in a first fluidized bed wherein they are preheated or preheated and reduced from the ferric state to magnetic oxide of iron, and are then further reduced in subsequent beds to ferrous oxide and finally to metallic iron. The separate stages may be operated at the same or different elevated temperatures and each may contain a plurality of reduction zones or beds.

In all such processes it is desired to operate at a high temperature to achieve maximum reduction of the ore in a minimum amount of time and with minimum reducing gas requirements. The use of high temperatures presents little difficulty in the fluidized beds containing higher oxides of iron, i.e., the ferric oxides and magnetic oxides. However, in the ferrous reduction zones i.e., those containing at least partly metallic iron, high temperatures present grave difficulties. When the particulate reduced iron ore in ferrous reduction zones is exposed to temperatures high enough to achieve good reduction kinetics, the beds tend to defluidize or bog.

Bogging is a phenomenon manifested by a stickiness occurring at the surfaces of the individual solids iron ore particles. It is postulated and fairly well supported that the surfaces of the individual ore particles become covered in whole or in part, depending on temperature, with the crystalline forms of iron. These crystalline forms, microscopic in character, often take on the appearance of nodules or whiskers extending outwardly from the individual reduced ore particles. Because of these projections, the particles tend to attach one to another upon contact so that individual iron ore particles cling or weld together to form aggregates or agglomerates. Such phenomenon militates against proper fluidization of the particles and, hence, bogging or loss of fluidization of the bed occurs. This phenomenon is not unlike sintering of the particles in its effect; however, it differs from sintering inasmuch as the latter is caused by an actual melting of the reduced iron upon the surfaces of the particles.

Bogging, then, is a very undesirable phenomenon and the tendency of an ore to bog increases with increasing temperature, generally as the degree of metallization increases. High temperatures ranging just below that which will produce sintering, i.e., about 1,800° F. for most ores, are desired to achieve efficient and rapid reduction. Thus, one is presented with a dilemma since, on the one hand, the higher the temperature the more acute the tendency toward bogging, and, on the other hand, the lower the temperature the less the efficiency of the process. With certain ores, e.g., Carol Lake ore, a specular hematite from Canada, the tendency to bog at elevated temperature is especially severe, and for this reason it is especially difficult to treat this and some other ores in a fluidized iron ore reduction process.

It has heretofore been known that, under certain circumstances, the tendency of ore to stick at high temperatures could be alleviated to a certain extent by the use of refractory-type additives. More recently, it was determined that certain materials, notably metal oxides and carbonates of the metals from Group IIA of the Periodic Chart of the Elements could be added directly to the ferrous reduction zones of a staged fluidized iron ore reduction process to achieve particularly astonishing and effective results in alleviating the tendency of the fluidized beds to defluidize or bog. In particular, it was disclosed and claimed in the parent applications of this application that by introducing oxides or carbonates of magnesium or calcium, or mixtures or precursors of these materials, directly into the ferrous reduction zones of a staged fluidized iron ore reduction process, the tendency of the ore to bog could be alleviated even at very high temperatures, e.g., 1,600° F.

SUMMARY OF THE INVENTION

It has now been found that by adding directly to the ferrous reduction zone or zones of a staged fluidized iron ore reduction process a variety of additives having critical characteristics, bogging or defluidization of the zones can be virtually eliminated even at high temperatures. The class of compounds which can be used in accordance with the present invention includes those additives, or their precursors, having a melting point higher than the melting point of metallic iron and which are sufficiently stable in the process environment to avoid being converted to lower melting substances. Thus, for example, when metal oxides are used as additives, it is essential that they either be more resistant to reduction than the iron oxides in the fluid bed, i.e., that they have a greater heat of formation, or that after reduction, the resulting metal has a higher melting point than that of iron.

The particulate additives of the present invention must include particles of extremely fine particle sizes. To prevent bogging at temperatures which are conductive to bogging, it is essential that there be present effective amounts ranging at least about 0.05 w/o, based on the total solids in the fluid bed, of additive particles less than about 10 microns, preferably less than about 2 microns, in diameter. In a preferred operation, the additive particles include about 0.3 to 5 w/o of particles having a diameter in the range from about 0.1 to 2 microns.

The classes of materials which can be used as additives in the present invention include compounds of metals of Group IIA of the Periodic Chart of the Elements, (Handbook of Chemistry and Physics, Chemical Rubber Publishing Co., 35th edition, 1953, pages 392–393) such as the oxides and carbonates of magnesium, calcium, barium, and strontium. Sulfates can also be used; however, it is generally undesirable to contaminate the reduced iron product with sulfur, when it is to be used in steelmaking processes. Certain metal compounds of Group IIIA, such as alumina or bauxite, aluminum hydroxide, and boron nitride have suitable melting points and heats of formation for use in the present invention. Similarly, materials from Groups IVA and IVB, such as graphite, coke, silica (including quartz), kieselguhr, titanium dioxide, zirconium nitride and zirconium oxide can also be used. Materials from Group VIB such as chrome ore, which contains high percentages of chrome oxide, can be used. Manganese dioxide, from Group VIIB, is also suitable. The manganese dioxide converts to manganese dioxide at high temperatures, the latter compound being higher melting than iron.

A wide variety of ferrous materials can also be used as antibogging agents. Among these are such materials as perlite and numerous ferroalloys, such as ferromanganese, ferrozirconium, ferrocalcium-manganese-silicon, ferrocalcium-silicon, ferrochrome, ferrosilicon, ferrotungsten, ferrovanadium, and the like. Certain pure metals can also be used, including boron, chromium, molybdenum, titanium, tungsten, vanadium, and zirconium. Alloys, metals, and reducible oxides of metals are often useful where it is desired to produce a reduced iron product containing other metals for use in the direct production of certain alloy steels.

Also useful are certain compounds and mixtures of compounds having metallic constituents from multiple groups, particularly Groups IIA, IIIA, IVA, IVB, and VIII. Materials having high melting points and capable of remaining relatively inert or forming inert materials, within the reducing conditions of an iron ore reduction process include calcium silicate, wollastonite, kaolin (a hydrated alumino silicate which decomposes at high temperatures to form mullite and cristobalite), zircon, bentonite (hydrated silicate of calcium and magnesium), feldspar (a potassium alumino silicate), mica (a hydrated potassium alumino silicate), pumice (which contains silicates of aluminum, sodium, and potassium), talc (a hydrated magnesium silicate), and vermiculite (hydrated silicates of aluminum, iron, and magnesium). Calcium chromate also has suitable characteristics for use as an antibogging agent.

Particularly preferred antibogging agents are the finely ground compounds, including mixtures and precursors of the compounds, from the oxides and carbonates of Group IIA metals, titanium dioxide, zircon, alumina, silica, graphite, calcium silicate and the ferroalloys.

The reasons for the effectiveness of these added agents in inhibiting or preventing bogging are not fully understood. However, it is believed that the novel additives of this invention chemically react with, alter, or otherwise poison the nodular growths or sites on the surface of the individual iron ore particles which form as the temperature is increased. Because of this poisoning effect, the normal tendency of the particles to stick or bridge together upon physical contact of one particle with another is inhibited or eliminated.

The particularly surprising effect of adding the agents directly to the ferrous reduction zones is not fully understood. However, one theory is that agents which are in very fine particle size and have low densities tend to be entrained easily in the rising reducing gases and, consequently, are partially carried out of the reactor with the gases when added at the top. On the other hand, when the very fine particles are added directly to the ferrous reduction zones, they tend to adhere immediately to the sticky metallic sites on the reduced ore particles, and thus entrainment is reduced. It is also thought that one possible reason for the increased effectiveness of adding directly to ferrous reduction zones is that when particles are added to the top of the reactor, the ones adhering to the surface of the particles lose their mobility and are unable to then move to a site or sticky point which later develops. On the other hand, those additive particles added directly to the ferrous reduction zones immediately attach themselves to the most sticky points on the surfaces of the ore particles. Thus, the stickiest sites are the ones best protected in the sensitive ferrous zones.

The additives of this invention can be added to the ferrous reduction zones in any acceptable manner as long as there is provided therein the minimum effective amount of particles in a sufficiently finely divided state. For example, hydrates, oxalates, or other precursors of the various additives can be used, provided they will decompose to release the effective additives at process conditions. It is essential that the additives be provided within the ferrous zone in a very finely divided state. When the particle size is too coarse, the additives are unsuitable for achieving their intended purpose. It is possible, however, to add to a ferrous reduction zone a range of particle sizes obtained by crushing coarser particles and adding a screen fine portion to the bed, or beds. For example, conventional grinding of many additives, even to a relatively coarse size, e.g., finer than about 14 mesh (Tyler screen), may provide significant quantities of particles less than 10 microns in size. Thus, when large quantities, e.g., 5 to 10 percent, of a large screen size of material is added to the ferrous reduction zones, there may be included therein by random distribution of size ranges resulting from the grinding, a sufficient amount of extremely finely divided material to prevent bogging. This is particularly true of those additives which are soft or otherwise relatively easy to grind. It may, therefore, be more convenient for handling and feeding purposes to use a screen size of particles averaging substantially larger than 10 microns in diameter. Surprisingly, additives which would be completely unacceptable for antibogging purposes, if added to the initial or first stage of a staged fluidized iron ore reduction process, are completely effective when added directly to ferrous reduction zones in sufficient concentrations of particles in a very finely divided state.

DESCRIPTION OF THE PREFERRED EMBODIMENTS

In a particularly preferred embodiment according to this invention, oxidic ores or iron oxides solids particles are contacted with upwardly flowing reducing gases and a plurality of staged zones are provided. The zones contain fluidized beds operated at different temperatures and the ore in each stage is at a different stage of reduction from that in other stages. The ore descends from stage to stage through nonfluidized standpipes, overflowing from one reduction stage into a standpipe and descending to the next stage. Thus, the ore is progressively reduced to lower and lower states of oxidation. Also, the reducing gas in contact with the beds varies from stage to stage in degree of oxidation. There is provided, in accordance with such embodiment, one or more ferric reduction zones operated at temperatures ranging from about 1,000° F. to about 1,800° F. and one or more ferrous reduction zones operated at temperatures ranging from about 1,300° F. to about 1,600° F. The antibogging additives are added to the ferrous reduction zone or zones. Cyclones or other gas-solids separators are used to remove entrained particles of ore and additive from the reducing gas between stages. The separated solids pass out of the cyclone standpipe into the fluidized bed below. One method of adding antibogging agent is to introduce it into the cyclone standpipe feeding the first ferrous zone. Alternatively, it can be added to the overflow standpipe from the next higher reduction stage or even separately injected directly into the fluidized bed. Preferably, the fine additive particles are introduced directly to the ferrous reduction zones through one or more of the nonfluidized standpipes from the cyclone separator or the preceding reduction zone, since contact with the reduced ore in the nonfluidized state permits the additive particles to adhere to the ore before the upwardly flowing reducing gas in the fluid beds can entrain them.

The following nonlimiting examples and pertinent demonstrations bring out the more salient features and provide a better understanding of the invention.

A large quantity of raw Carol Lake ore is pulverized in an impact mill to particle sizes ranging from about 75 to 210 microns (65–200 mesh), and divided into several like portions. This ore is one well known as possessing a severe tendency to bog.

A portion of the ore is charged into a fluidized iron ore reactor or reduction process wherein is provided a series of four staged fluidized zoned, two ferric reduction zones and two ferrous reduction zones. The ore is fluidized by an upwardly flowing gas initially about 60 percent hydrogen and 40 percent carbon monoxide. The gas flows from a zone containing an iron ore at a lower level of oxidation to the next higher level of oxidation, i.e., from the bottom to the top of the reactor. The reduced ore moves from the top to the bottom of the reactor and from one stage of reduction to the next. The ferric reduction stages, wherein ferric oxides are reduced essentially to magnetic oxides of iron, are operated at about 1,300° F., and the ferrous reduction stages wherein the ferrous oxide is reduced, in the final stage, to provide about 94 percent metallization, are maintained at about 1,450° F.

Pursuant to operating at such conditions, the ferrous reduction beds show signs of bogging within about 10 minutes and are severely and totally bogged in only about 20 minutes of continuous operation.

EXAMPLE 1

The foregoing demonstration is repeated in precise detail employing a second portion of the ore except in this instance 1 percent of calcium oxide powder, based on the weight of iron ore feed, ground to a particle size distribution of minus 400 mesh with about 0.3 percent less than 10 microns in size, is added to and continuously charged directly into the first ferrous reduction zone fluidized bed. At the end of a 24-hour period, when the test is arbitrarily terminated, there is not the slightest evidence of bogging or of any tendency toward bogging. The beds appear normal and the process functions normally in every way.

EXAMPLE 2

When Example 1 is repeated with another portion of ore and calcium carbonate added in equivalent to a 1 percent concentration, with about 0.5 percent being less than 10 microns in size, there is yet no bogging or tendency toward bogging at the end of a 24-hour period.

In sharp contrast, however, when this demonstration is repeated at this high temperature without calcium carbonate addition, severe bogging occurs in less than about 20 minutes.

EXAMPLE 3

When a laboratory test reactor is used to further extend the temperature of operation of the ferrous reduction zones of EXAMPLE 1 to 1,570° F. and the same amount of calcium carbonate is added to the process, there is no evidence of bogging at the end of a 180-minute test period. It has been fairly well established that under the standard laboratory test conditions, successful operation for 180 minutes is indicative of the acceptability of the antibogging agent.

EXAMPLE 4

When Example 1 is repeated except that ground alumina, silica, graphite, and calcium silicate are successively added to the process in 1.5 percent concentration with 0.5 percent less than 2 microns and about 1 percent less than 10 microns in size, equally good benefits are also obtained. No tendency to bog is noted during the total rest period.

Further comparative data are set forth hereafter to shown the advantages of the present novel classes of additives in inhibitive bogging. In the following runs, a different ore—viz, Cerro Bolivar ore—is employed. While the tendency of the ore to bog occurs at higher temperature than with the Carol Lake ore and the bogging tendency is somewhat less severe, nevertheless, in these runs the temperature is increased to an extremely high plateau—viz, 1,600° F.—which would normally induce quite severe bogging.

In these runs a Cerro Bolivar ore is pulverized as in Example 1, divided into several portions, and separately reduced with a 60:40 hydrogen:carbon monoxide gaseous mixture. Antibogging agent is continuously added to the top ferrous reduction zone of the test reactor. The ferrous zone temperature is maintained at about 1,600° F. by controlling reducing gas inlet temperature. The bogging test is continued for 180 minutes unless bogging occurs earlier, in which case the test is terminated as indicated below:

| Example | Additive | Fluidization After 180 Minutes |
| --- | --- | --- |
| 5 | None | |
|  | 1% Coarse CaO (Commercial Grade) (65 to 200 Mesh) | Bog 37 min. |
| 6 | 1% CaO (1 Micron Average Particle Size) | Bog 65 min. |
| 7 | 0.1% MgO (1 Micron Average Particle Size) | Smooth |
| 8 | 0.1% MgO (Finer than 400 Mesh) (0.5% Finer than 2 Microns) | Smooth |
| 9 | 0.2% MgCO₃ (Finer than 400 Mesh) | Smooth |

(0.5% Finer than 2 Microns)

The following data clearly show the outstanding effectiveness of other additives of very small particle sizes when added directly to ferrous reduction zones:

| Example | Additive | Fluidization After 180 Minutes |
| --- | --- | --- |
| 10 | 0.5% Dolomite (CaMg(CO₃)₂) (Finer than 10 Microns) | Smooth |
| 11 | 1.0% Minus 400 Mesh Kaolin (0.5% Less than 2 Microns) | Smooth |
| 12 | 0.5 Titanium Dioxide (Finer than 10 Microns) | Smooth |
| 13 | 1.0% Ferrozirconium Alloy (Finer than 325 Mesh, 0.5% Finer than 2 Microns) | Smooth |
| 14 | 1.0 Minus 400 Mesh Kieselguhr (0.5% Finer than 10 Microns) (Added to Standpipe Feeding First Ferrous Zone) | Smooth |

Similar results are achieved using very finely divided high-melting metals including molybdenum, tungsten, vanadium, and the like.

It is apparent that many variations can be made within the scope of the invention. It is to be understood that the additives of this invention need not be added in a pure state but can be added, e.g., as a crude one, as long as the total added material includes a sufficient amount of effective finely divided antibogging agent to prevent sticking and defluidization of the fluid beds of the ferrous reduction zones.

What is claimed is:

1. In a process for the production of iron by direct reduction of particulate oxidic iron ore wherein ore is fed continuously to a series of staged fluidized zones including at least a ferric reduction zone and a ferrous reduction zone and wherein said ore descends through the series of zones and is progressively reduced by ascending reducing gases to lower states of oxidization, the improvement comprising:

maintaining said reduction zones at temperatures ranging from about 1,000° F. to about 1,800° F., and adding directly to said ferrous reduction zone an additive capable of providing particulate materials within said zone which are stable at process conditions in effective amounts ranging at least about 0.05 w/o, based on total solids in said zone, of particles less than about 10 microns in diameter, said additive being selected from the group consisting of carbon, graphite, materials containing at least one element from Groups overflow IIIA, IVB, VIB, VIIB, VIII, silicon, and mixtures thereof.

2. The process of claim 1 wherein said particles range less than about 2 microns in diameter.

3. The process of claim 1 wherein said particles include about 0.3 to 5 w/o, based on total solids in said zone, or particles ranging from about 0.1 to about 2 microns in diameter.

4. The process of claim 1 wherein said additive comprises a ferroalloy.

5. The process of claim 1 wherein said additive comprises titanium dioxide.

6. The process of claim 1 wherein said additive comprises alumina.

7. The process of claim 1 wherein said additive comprises graphite.

8. The process of claim 1 wherein said additive is added in a mixture with coarse additive particles of larger sizes ranging up to about 14 mesh.

9. The process of claim 1 wherein said ferrous reduction zone ranges from about 1,300° F. to about 1,600° F. in temperature.

10. The process of claim 1 wherein said ferrous reduction zone is fed ore from a preceding zone of said series through a nonfluidized standpipe and said additive is introduced said said standpipe to contact the particles therein before entering said ferrous reduction zone.

11. The process of claim 1 wherein said ascending reducing gases entrain particles of ore from said ferrous reduction zone and said entrained ore is separated from the gases and returned to the ferrous reduction zone through a nonfluidized standpipe and said additive is introduced into said standpipe to contact the particles therein before entering said ferrous reduction zone.

PO-1050
(5/69)

UNITED STATES PATENT OFFICE
CERTIFICATE OF CORRECTION

Patent No. 3,615,352   Dated October 26, 1971

Inventor(s) Francis X. Mayer

It is certified that error appears in the above-identified patent and that said Letters Patent are hereby corrected as shown below:

In Claim 1, column 6, line 51, the amount reading "0.05 w/o" should read -- 0.05 wt. % --; in claim 1, column 6, line 54, the word "overflow" should be deleted.

In Claim 3, column 6, line 60, the amount "5 w/o" should read -- 5 wt. % --.

Signed and sealed this 16th day of May 1972.

(SEAL)
Attest:

EDWARD M. FLETCHER, JR.
Attesting Officer

ROBERT GOTTSCHALK
Commissioner of Patents